United States Patent
Tokuyama

(10) Patent No.: US 7,518,963 B2
(45) Date of Patent: Apr. 14, 2009

(54) PHASE DIFFERENCE DETECTION CIRCUIT AND OPTICAL DISK DEVICE

(75) Inventor: Masato Tokuyama, Hyogo (JP)

(73) Assignee: Ricoh Company, Ltd, Tokyo (JP)

( * ) Notice: Subject to any disclaimer, the term of this patent is extended or adjusted under 35 U.S.C. 154(b) by 659 days.

(21) Appl. No.: 11/146,336

(22) Filed: Jun. 6, 2005

(65) Prior Publication Data

US 2005/0275410 A1 Dec. 15, 2005

(30) Foreign Application Priority Data

Jun. 9, 2004 (JP) ............... 2004-171343

(51) Int. Cl.
*G11B 5/09* (2006.01)
(52) U.S. Cl. ............... 369/47.28; 369/124.14; 369/44.34; 369/59.21; 369/59.2; 369/53.23
(58) Field of Classification Search ............ 369/59.17, 369/59.2, 59.21, 47.28, 124.14
See application file for complete search history.

(56) References Cited

U.S. PATENT DOCUMENTS

| 6,266,305 | B1 * | 7/2001 | Buchler ............ 369/44.32 |
| 6,801,488 | B2 * | 10/2004 | Kato et al. ............ 369/59.17 |
| 6,977,982 | B2 * | 12/2005 | Ma et al. ............ 369/44.34 |
| 2004/0228233 | A1 * | 11/2004 | Hiratsuka ............ 369/44.34 |
| 2004/0252600 | A1 * | 12/2004 | Takehara ............ 369/44.34 |

FOREIGN PATENT DOCUMENTS

| JP | 58203636 | | 11/1983 |
| JP | 3-18255 | | 1/1991 |
| JP | 10124890 | A * | 5/1998 |
| JP | 10-275345 | | 10/1998 |
| JP | 2000-76667 | | 3/2000 |
| JP | 2001-135079 | | 5/2001 |
| JP | 2003-198342 | | 7/2003 |
| JP | 2004-260488 | | 9/2004 |
| JP | 2004-362691 | | 12/2004 |
| TW | 382703 | B | 2/2000 |

OTHER PUBLICATIONS

Jan. 14, 2008 search report in connection with corresponding Taiwan patent application No. 94118929.

* cited by examiner

*Primary Examiner*—Jorge L Ortiz Criado
(74) *Attorney, Agent, or Firm*—Cooper & Dunham LLP

(57) ABSTRACT

A phase difference detection circuit that is formed by digital circuits having a small circuit area. In the phase difference detection circuit, the circuits for generating a tracking error signal are structured by digital circuits, and a digital tracking error signal TE is generated from digital signals output from comparators. The latest previous phase difference data are stored in a phase difference memory, and a phase difference window PW is defined from the average phase difference calculated from the stored phase differences.

18 Claims, 9 Drawing Sheets

PHASE DIFFERENCE DETECTION CIRCUIT AND OPTICAL DISK DEVICE

BACKGROUND OF THE INVENTION

1. Field of the Invention

The present invention relates to a phase difference detection circuit for detecting a phase difference between plural signals, and an optical disk device for recording or reproducing data in an optical disk such as a CD-R/RW, a DVD-R/RW, and a DVD+R/RW, and more particularly, to a phase difference detection circuit that generates a tracking error signal, which is used as a control signal for controlling a servo motor, and an optical disk device using the phase difference detection circuit.

2. Description of the Related Art

In the related art, a so-called "three-beam method" is widely used for generating a tracking error signal in a CD (Compact Disk) reproduction device.

In a DVD (Digital Versatile Disk) reproduction device, because the track pitch of a DVD is as narrow as 0.74 μm, which is less than half of the track pitch of a CD, and the three-beam method requires much high accuracy of the device, usually, a so-called "phase difference tracking" method with one beam is used for generating a tracking error signal in the DVD reproduction device. For example, Japanese Laid Open Patent Application No. 10-275345 and Examined Japanese Patent Application (Koukoku) No. 3-18255 disclose techniques in this field.

In the phase difference tracking method, the reflected light of a main beam is received by four divisional light receiving elements A, B, C, D, and is converted into electrical signals; a signal SA and a signal SC from two diagonal light receiving elements A and C, and a signal SB and a signal SD from two diagonal light receiving elements B and D, are summed respectively, then the two summation signals S(A+C) and S(B+D) are converted into respective digital signals in a comparator. From edges of the two digital signals, a phase difference is detected by a phase comparator.

The output signal from the phase comparator is a PWM (Pulse Width Modulation) signal, which may have three levels. The PWM signal is smoothed by a low-pass filter or the like, and is output as a tracking error signal.

Compared to a push-pull method using three beams, the phase difference tracking method has an advantage in small influence due to signal levels or the track pitches.

When using the phase difference tracking method in an optical disk reproduction device, in order to reproduce lengths of pits on the recording surface of an optical disk when converting reproduction signals from the four divisional light receiving elements A, B, C and D into digital signals, analog processing, such as amplification or filtering, is performed.

FIG. 9 is a block diagram illustrating a configuration of a DPD (Differential Phase Detection) circuit, which is used as a phase difference detection circuit in an optical disk device of the related art.

As illustrated in FIG. 9, the four divisional light receiving elements A, B, C and D convert the received reflected light into reproduction signals, which are electrical signals, and the reproduction signals are amplified by corresponding amplifiers AMPa through AMPd. The signal SA and the signal SC, which are output from the two diagonal light receiving elements A and C and amplified by the amplifiers AMPa and AMPb, are summed in a calculation circuit 101; the resulting summation signal is output to a comparator 103, and is converted into a digital signal S103 in the comparator 103. The resulting digital signal S103 is input to a phase comparator 105.

Similarly, the signal SB and the signal SD, which are output from the two diagonal light receiving elements B and D and amplified by the amplifiers AMPb and AMPd, are summed in a calculation circuit 102: the resulting summation signal is output to a comparator 104, and is converted into a digital signal S104 in the comparator 104. The resulting digital signal S104 is input to the phase comparator 105.

The phase comparator 105 detects a phase difference between the digital signal S103 from the comparator 103 and the digital signal S104 from the comparator 104. When the phase of the digital signal S103 is earlier than the phase of the digital signal S104, the phase comparator 105 outputs a pulse signal (down signal DNa) at a high level having a width equaling their phase difference. Whereas, when the phase of the digital signal S104 is earlier than the phase of the digital signal S103, the phase comparator 105 outputs a pulse signal (up signal UPa) at a high level having a width equaling their phase difference.

The up signal UPa from the phase comparator 105 is smoothed by a low-pass filter 106, and is input to a non-inverted input terminal of an operational amplifier AMP, whereas the down signal DNa from the phase comparator 105 is smoothed by a low-pass filter 107, and is input to an inverted input terminal of the operational amplifier AMP.

The operational amplifier AMP differentially amplifies the input signals and outputs a tracking error signal TEA.

Specifically, when the voltage of the signal smoothed by the low-pass filter 106 is greater than the voltage of the signal smoothed by the low-pass filter 107, a tracking error signal TEA having a positive voltage is output; when the voltage of the signal smoothed by the low-pass filter 106 is less than the voltage of the signal smoothed by the low-pass filter 107, a tracking error signal TEA having a negative voltage is output.

In this way, even though the tracking error signal TEA is an analog signal, in an optical disk device for reproducing or recording data in an optical disk the tracking error signal TEA is converted into a digital signal by AD conversion in circuits at later stages of the DPD circuit 100 (not illustrated), and is used as a servo signal for controlling a servo motor (not illustrated).

However, because the phase comparator 105 and the low-pass filters 106, 107 are analog circuits, condensers and resistors are used; hence, the area of the whole circuit is large.

SUMMARY OF THE INVENTION

It is a general object of the present invention to solve one or more of the problems of the related art.

A more specific object of the present invention is to provide a phase difference detection circuit formed by a digital circuit and having a small circuit area, and an optical disk device including the digital phase difference detection circuit.

According to a first aspect of the present invention, there is provided a phase difference detection circuit that detects a phase difference between at least two signals and outputs a phase difference signal indicating the detected phase difference, said at least two signals being obtained by summing predetermined signals among plural signals input to the phase difference detection circuit, said phase difference detection circuit comprising: a phase difference correction circuit that detects and stores the phase difference between the at least two signals at a predetermined timing, wherein when the detected phase difference is greater than an upper limit of a phase difference window, the phase difference correction circuit corrects the detected phase difference to be the upper limit and outputs the corrected phase difference; when the detected phase difference is less than a lower limit of the phase difference window, the phase difference correction circuit corrects the detected phase difference to be the lower limit and outputs the corrected phase difference, said phase difference window being defined in a range from said lower limit to said upper limit, said upper limit and said lower limit being defined to be an average value of plural of said stored phase differences plus and minus a predetermined value, respectively.

According to a second aspect of the present invention, there is provided a phase difference detection circuit that detects plural phase differences between predetermined signals among plural signals input to the phase difference detection circuit, outputs plural phase difference signals each indicating one of the detected phase differences, sums predetermined signals of the phase difference signals, and outputs the summed signal, said phase difference detection circuit comprising: a phase difference correction circuit that detects and stores the phase differences at predetermined timings, wherein when the detected phase difference is greater than an upper limit of a phase difference window, the phase difference correction circuit corrects the detected phase difference to be the upper limit and outputs the corrected phase difference; when the detected phase difference is less than a lower limit of the phase difference window, the phase difference correction circuit corrects the detected phase difference to be the lower limit and outputs the corrected phase difference, said phase difference window being defined in a range from said lower limit to said upper limit, said upper limit and said lower limit being defined to be an average value of plural of said stored phase differences plus and minus a predetermined value, respectively.

Preferably, the phase difference correction circuit comprises a digital circuit, and the phase difference signal is a digital signal.

As an embodiment, the phase difference correction circuit prohibits storage of the detected phase difference when the detected phase difference is out of the phase difference window.

As an embodiment, the phase difference correction circuit converts the two signals into digital signals, respectively; and the phase difference correction circuit prohibits storage of the detected phase difference between the two signals when the pulse length of at least one of the digital signals is less than a predetermined value.

As an embodiment, the phase difference correction circuit sets the range of the phase difference window to be a predetermined value W1 when the output phase difference is within a predetermined range, and sets the range of the phase difference window to be a predetermined value W2 greater than W1 when the output phase difference is out of the predetermined range.

As an embodiment, the phase difference correction circuit sets the range of the phase difference window to be a predetermined value W1 when the phase difference before the correction is within a predetermined range, and sets the range of the phase difference window to be a predetermined value W2 greater than W1 when the phase difference before the correction is out of the predetermined range, said predetermined range being defined based on the average value.

As an embodiment, the phase difference detection circuit further comprises a conversion circuit that converts the two signals into digital signals, respectively, wherein the phase difference correction circuit comprises: a phase comparison circuit that compares phases of the digital signals output from the conversion circuit, and outputs a signal indicating a comparison result; a phase difference generation circuit that detects a phase difference between the two signals from the signals output from the phase comparison circuit, and generates and outputs a signal indicating the detected phase difference; a phase difference storage circuit that stores the phase difference detected in the phase difference generation circuit; and a phase difference window generation circuit that calculates the average value of the phase differences stored by the phase difference storage circuit, and generates the phase difference window by adding the predetermined value to the average value and subtracting the predetermined value from the average value. The phase difference generation circuit receives the phase difference window from the phase difference window generation circuit, corrects the detected phase difference by using the phase difference window, and prohibits storage of the detected phase difference in phase difference storage circuit when the detected phase difference is out of the phase difference window.

As an embodiment, the phase difference detection circuit further comprises a conversion circuit that converts the two signals into digital signals, respectively, wherein the phase difference correction circuit comprises: a pulse length detection circuit that detects pulse lengths of the digital signals output from the conversion circuit; a phase comparison circuit that compares phases of the digital signals output from the conversion circuit, and outputs a signal indicting a comparison result; a phase difference generation circuit that detects a phase difference between the two signals from the signals output from the phase comparison circuit, and generates and outputs a signal indicating the detected phase difference; a phase difference storage circuit that stores the phase difference detected by the phase difference generation circuit; and a phase difference window generation circuit that calculates the average value of the phase differences stored in the phase difference storage circuit, and generates the phase difference window by adding the predetermined value to the average value and subtracting the predetermined value from the average value. The phase difference generation circuit receives the phase difference window from the phase difference window generation circuit, corrects the detected phase difference by using the phase difference window, and prohibits storage of the detected phase difference in the phase difference storage circuit when at least the pulse length of one of the digital signals detected by the pulse length detection circuit is less than a predetermined value.

As an embodiment, the phase difference correction circuit comprises: a determination circuit that determines whether the output phase difference is within the predetermined range; and a window range modification circuit that modifies the range of the phase difference window in the phase difference window generation circuit in response to a determination result from the determination circuit. The window range modification circuit sets the range of the phase difference window to be a predetermined value W1 when the determination circuit determines that the output phase difference is within the predetermined range, and sets the range of the phase difference window to be a predetermined value W2 greater than W1 when the determination circuit determines that the output phase difference is out of the predetermined range.

As an embodiment, the phase difference correction circuit comprises: a determination circuit that determines whether the phase difference before the correction is within the predetermined range; and a window range modification circuit that modifies the range of the phase difference window in the phase difference window generation circuit in response to a determination result from the determination circuit. The window range modification circuit sets the range of the phase difference window to be a predetermined value W1 when the determination circuit determines that the phase difference before the correction is within the predetermined range, and sets the range of the phase difference window to be a predetermined value W2 greater than W1 when the determination circuit determines that the phase difference before the correction is out of the predetermined range.

According to a third aspect of the present invention, there is provided an optical disk device for recording and reproducing data in an optical disk, comprising: a phase difference detection circuit that detects a phase difference between at least two signals and outputs a phase difference signal indicating the detected phase difference, said at least two signals being obtained by summing predetermined signals among a plurality of signals output from plural light receiving elements that receive reflected light of a laser beam incident on a recording plane of the optical disk, wherein the phase difference detection circuit includes a phase difference correction circuit that detects and stores the phase difference between the at least two signals at a predetermined timing, when the detected phase difference is greater than an upper limit of a phase difference window, the phase difference correction circuit corrects the detected phase difference to be the upper limit and outputs the corrected phase difference, when the detected phase difference is less than a lower limit of the phase difference window, the phase difference correction circuit corrects the detected phase difference to be the lower limit and outputs the corrected phase difference, said phase difference window being defined in a range from said lower limit to said upper limit, said upper limit and said lower limit being defined to be an average value of plural of said stored phase differences plus and minus a predetermined value, respectively.

According to a fourth aspect of the present invention, there is provided an optical disk device for recording and reproducing data in an optical disk, comprising: a phase difference detection circuit that detects plural phase differences between predetermined signals among plural signals output from plural light receiving elements that receive reflected light of a laser beam incident on a recording plane of the optical disk, outputs plural phase difference signals each indicating one of the detected phase differences, sums predetermined signals of the phase difference signals, and outputs the summed signal, wherein the phase difference detection circuit includes a phase difference correction circuit that detects and stores the phase differences at predetermined timings; when the detected phase difference is greater than an upper limit of a phase difference window, the phase difference correction circuit corrects the detected phase difference to be the upper limit and outputs the corrected phase difference, and when the detected phase difference is less than a lower limit of the phase difference window, the phase difference correction circuit corrects the detected phase difference to be the lower limit and outputs the corrected phase difference, said phase difference window being defined in a range from said lower limit to said upper limit, said upper limit and said lower limit being defined to be an average value of plural of said stored phase differences plus and minus a predetermined value, respectively.

Preferably, the phase difference correction circuit comprises a digital circuit, and the phase difference signal is a digital signal.

As an embodiment, the phase difference correction circuit prohibits storage of the detected phase difference when the detected phase difference is out of the phase difference window.

As an embodiment, the phase difference correction circuit converts the two signals into digital signals, respectively; and the phase difference correction circuit prohibits storage of the detected phase difference between the two signals when a pulse length of at least one of the digital signals is less than a predetermined value.

As an embodiment, the phase difference correction circuit sets the range of the phase difference window to be a predetermined value W1 when the output phase difference is within a predetermined range, and sets the range of the phase difference window to be a predetermined value W2 greater than W1 when the output phase difference is out of the predetermined range.

As an embodiment, the phase difference correction circuit sets the range of the phase difference window to be a predetermined value W1 when the phase difference before the correction is within a predetermined range, and sets the range of the phase difference window to be a predetermined value W2 greater than W1 when the phase difference before the correction is out of the predetermined range, said predetermined range being defined based on the average value.

According to the present invention, because the previous phase differences are stored, it is possible to define a phase difference window as a range of available phase differences. In an on-track state in an optical disk, because the phase signal does not change drastically, when an input phase difference is out of the phase difference window, it can be judged that the input phase difference is related to phase anomaly or edge shift caused by small signal amplitude. By making correction to this, the phase difference is formed. As a result, it is possible to reduce the error of the phase difference, and it is possible to construct a phase difference detection circuit, such as a DPD circuit, with digital circuits, thus reducing the circuit area.

In addition, in the related art, in an optical disk device, because the signal output from the phase difference detection circuit indicating a phase difference is an analog signal, it is necessary to convert the signal into a digital signal at later stages of the DPD circuit, and due to this, efficiency of signal processing is low. In the present invention, because the phase difference detection circuit is constructed with digital circuits, and the signal indicating the phase difference is a digital signal, efficiency of signal processing is high.

In addition, because the phase difference correction circuit prohibits storage of the detected phase difference when the detected phase difference is out of the phase difference window, or when a pulse length of at least one of the digital signals is less than a predetermined value, the average value of the phase differences is obtained by only considering the detected phase differences within the phase difference window; hence, a temporary anomaly of phase differences does not influence the average phase difference. As a result, it is possible to reduce influence from absence of phase difference data due to small signal amplitude.

In addition, depending on the output phase difference or the phase difference before correction, the width of the phase difference window can be changed; for example, in a complete on-track state, by reducing the width of the phase difference window, correction to the phase difference becomes strong, whereas in a state deviating more or less from the complete on-track state, by increasing the width of the phase difference window, correction to the phase difference becomes weak. Furthermore, when a spot moves away from a track, the width of the phase difference window can be further increased to essentially prevent correction to the phase difference. In this way, by making correction to the phase difference in correspondence to actual situations, it is possible to further reduce errors of the phase differences.

In addition, because the range of the phase difference window is changed depending on whether the phase difference before correction is within a predetermined range that is defined based on the average value of the phase differences, it is possible to respond quickly to evolution of the phase difference, thereby improving the following capability of the phase difference window.

In addition, because two signals are converted into respective digital signals, and pulse lengths of the digital signals can be detected, it is possible to determine the corresponding relation between the phase difference at an edge of a pit and the pulse length. It is known that the phase difference associated with a short pulse length usually corresponds to small amplitude, wherein a phase anomaly can easily occur. To avoid this problem, in the present invention, it is required that phase differences associated with short pulse lengths not be stored. Due to this, it is possible to reduce influence of the phase anomaly.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

First Embodiment

Figure 1:
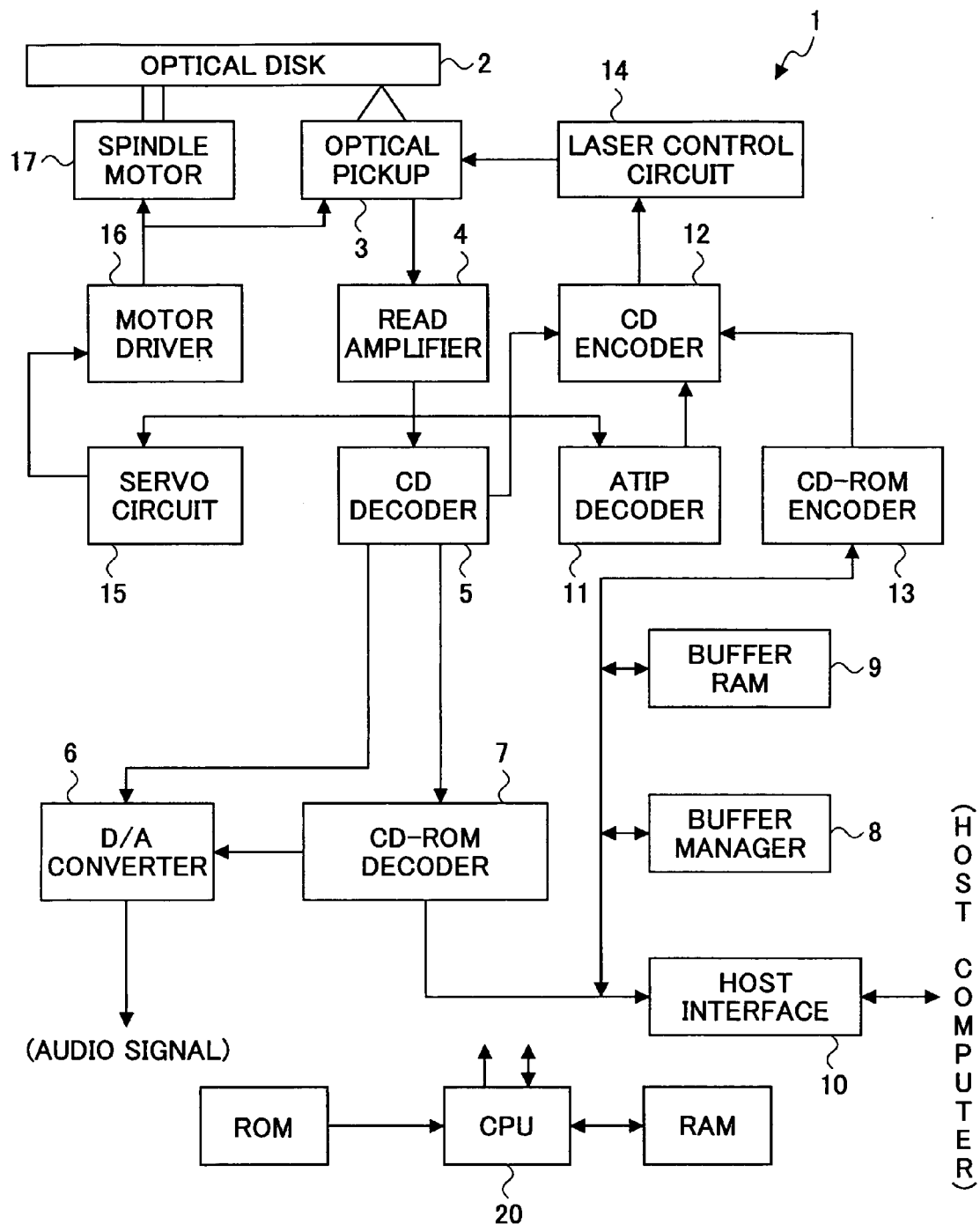
FIG. 1 is a block diagram showing a schematic configuration of an optical disk device 1 including a phase difference detection circuit according to a first embodiment of the present invention.

FIG. 1 is a block diagram showing a schematic configuration of an optical disk device 1 including a phase difference detection circuit according to a first embodiment of the present invention. Here, CD-R is used as an example.

The optical disk device 1 shown in FIG. 1 includes an optical pickup 3 for reading and writing data in an optical disk 2. Although not illustrated, the optical pickup 3 includes a semiconductor laser, an optical system, a focus actuator, a track actuator, a light receiving element, a position sensor, and others. The optical pickup 3 emits a laser beam to the optical disk 2 to read and write data in the optical disk 2.

The data signal read out by the optical pickup 3 is amplified and converted into a digital signal by a read amplifier 4. A CD decoder 5 performs EFM demodulation and CIRC computation (de-interleave, error correction, and so on) on the digital signal from the read amplifier 4, and then decodes the digital signal. For example, when the decoded data are used for producing audio data (referred to as "CD data" below), a D/A converter 6 performs D/A conversion on the decoded data and outputs the audio data.

The CD decoder 5 outputs the decoded CD data and data for use of computers (referred to as CD-ROM data) to a CD-ROM decoder 7. The CD-ROM decoder 7 loads the input data into a buffer RAM 9 as needed through a buffer manager 8. In order to further improve reliability of the data, the CD-ROM decoder 7 further performs error correction on the loaded data. In this process, reading of the data loaded in the buffer RAM 9, and data transfer with the buffer RAM 9 when writing data during error correction are performed through the buffer manager 8.

After the error correction by the CD-ROM decoder 7, the data are read out through the buffer manager 8, and sent to a host computer HC outside through a host interface 10. The host interface 10 is in compliance with ATAPI or SCSI standard, and acts as an interface between host computers HC.

In the optical disk 2 which has not been recorded yet, ATIP data are embedded in the manufacturing process. When writing data to unrecorded regions of the optical disk 2, the optical pickup 3 first reads out the ATIP data before the write operation. That is, the optical pickup 3 first reads out wobble signals on the optical disk 2, the wobble signals are amplified and converted into digital signals by the read amplifier 4, and are output to an ATIP decoder 11.

From the input ATIP data, the ATIP decoder 11 generates a synchronization signal (referred to as "ATIP Sync", below), time information (referred to as "ATIP time information", below), and CRC calculation results of the ATIP data (referred to as "ACRC results", below), and outputs these data to a CD encoder 12.

When writing data to unrecorded regions of the optical disk 2, the CD encoder 12 uses the ATIP data, which are input as information for detecting writing positions on the optical disk 2. The CD encoder 12 is able to write data at precise positions on the optical disk 2 by using the ATIP Sync and ATIP time information.

In doing so, in the unrecorded regions of the optical disk 2, it is possible to obtain time information indicating positions on the optical disk only from the ATIP data.

In contrast, in the recorded regions of the optical disk 2, the quality of the wobble signal is poor, and sometimes, the ATIP Sync and ATIP time information cannot be produced precisely from the ATIP data.

However, in the recorded regions of the optical disk 2, sub code Sync, which acts as the synchronization signal, and sub code data are recorded, and the CD decoder 5 processes the sub code data, and outputs the time information on the optical disk 2 to the CD encoder 12.

When writing data to recorded regions of the optical disk 2, the CD encoder 12 uses the sub code data to obtain the time information indicating positions on the optical disk 2.

The data to be written to the optical disk 2 is sent to the buffer RAM 9 from the host computer HC through the buffer manager 8. The CD-ROM encoder 13 reads data in the buffer RAM 9 through the buffer manager 8, and appends error correction codes, EDC codes, SYNC codes, and header information to the data, and then writes the data back into the buffer RAM 9.

In addition, the CD-ROM encoder 13 reads prepared data in the buffer RAM 9 through the buffer manager 8, and writes the data to a CIRC calculation RAM (described below) in the CD encoder 12. The CD encoder 12 performs the CIRC calculation on the data in the CIRC calculation RAM, appends error correction codes thereto, performs interleaving, further performs EFM modulation on the data after the calculation, and then outputs the data. The data output from the CD encoder 12 are recorded on the optical disk 2 through a laser control circuit 14 and the optical pickup 3.

The wobble signal obtained from the optical disk 2 is input to a servo circuit 15 through the read amplifier 4 and the optical pickup 3. The servo circuit 15 generates a rotation control signal, and the rotation control signal is supplied to a spindle motor 17 through a motor driver 16.

The CD decoder 5, the CD-ROM decoder 7, the host interface 10, the ATIP decoder 11, the CD encoder 12, the CD-ROM encoder 13, and others are controlled by a CPU 20.

Figure 2:
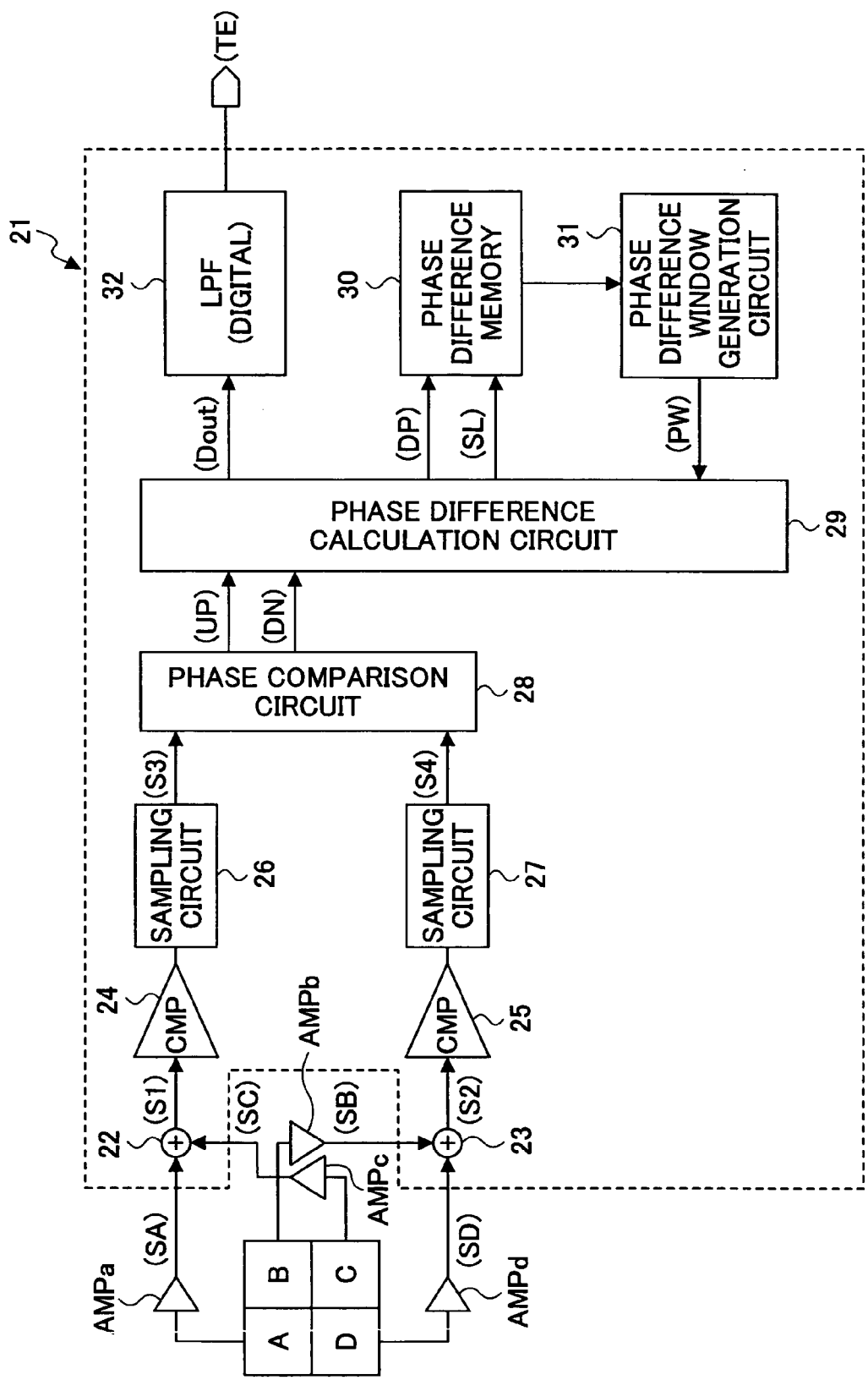
FIG. 2 is a block diagram showing a schematic configuration of a phase difference detection circuit 21 according to the first embodiment of the present invention.

FIG. 2 is a block diagram showing a schematic configuration of a phase difference detection circuit 21 according to the first embodiment of the present invention.

As illustrated in FIG. 2, four divisional light receiving elements A, B, C and D in the optical pickup 3 in FIG. 1 convert received reflected light into reproduction signals, which are electrical signals, and the reproduction signals are amplified by corresponding amplifiers AMPa through AMPd. The amplifiers AMPa through AMPd correspond to the read amplifier 4 in FIG. 1. The signals amplified by the amplifiers AMPa through AMPd are represented by SA through SD. Signals SA through SD are input to the phase difference detection circuit 21; for example, it is a DPD circuit in the servo circuit 15 in FIG. 1.

The phase difference detection circuit 21 detects a phase difference between a signal S1 and a signal S2 with S1 being a summation signal of the signal SA and the signal SC, and S2 being a summation signal of the signal SB and the signal SD. The phase difference detection circuit 21 generates and outputs a tracking error signal TE indicting the detected phase difference.

The phase difference detection circuit 21 includes an adding circuit 22 for summing the signal SA and the signal SC, an adding circuit 23 for summing the signal SB and the signal SD, a comparator 24 for converting the output signal from the adding circuit 22 into a digital signal, a comparator 25 for converting the output signal from the adding circuit 23 into a digital signal, a sampling circuit 26 for sampling the output signal from the comparator 24 based on a high frequency clock signal, and a sampling circuit 27 for sampling the output signal from the comparator 25 based on the same high frequency clock signal.

Further, the phase difference detection circuit 21 includes a phase comparison circuit 28 for comparing phases of a signal S3 sampled by the sampling circuit 26 and a signal S4 sampled by the sampling circuit 27, and a phase difference calculation circuit 29 for calculating a phase difference from a signal indicating the comparison results in phase comparison circuit 28.

Further, the phase difference detection circuit 21 includes a phase difference memory 30, which is formed from shift registers and is used for storing the signals indicating the detected phase difference calculated by the phase difference calculation circuit 29; a phase difference window generation circuit 31 that calculates the average value AVE of the phase differences stored in the phase difference memory 30 and an upper limit PWu and a lower limit PWd of the phase difference, generates a phase difference window PW covering a range from the lower limit PWd to the upper limit PWu, and outputs the phase difference window PW; and a low-pass filter 32 constructed by digital circuits.

In addition to the low-pass filter 32, the sampling circuits 26, 27, the phase comparison circuit 28, the phase difference calculation circuit 29, the phase difference memory 30, and the phase difference window generation circuit 31 are also constructed by digital circuits.

Further, the sampling circuits 26, 27, the phase comparison circuit 28, the phase difference calculation circuit 29, the phase difference memory 30, the phase difference window generation circuit 31, and the low-pass filter 32 correspond to the phase difference correction circuit in claims. In addition, the comparators 24, 25 correspond to the conversion circuit in claims, the sampling circuits 26, 27 and the phase comparison circuit 28 correspond to the phase comparison circuit in claims, the phase difference calculation circuit 29 corresponds to the phase difference generation circuit in claims, the phase difference memory 30 corresponds to the phase difference storage circuit in claims, and the phase difference window generation circuit 31 corresponds to the phase difference window generation circuit in claims.

Figure 3:
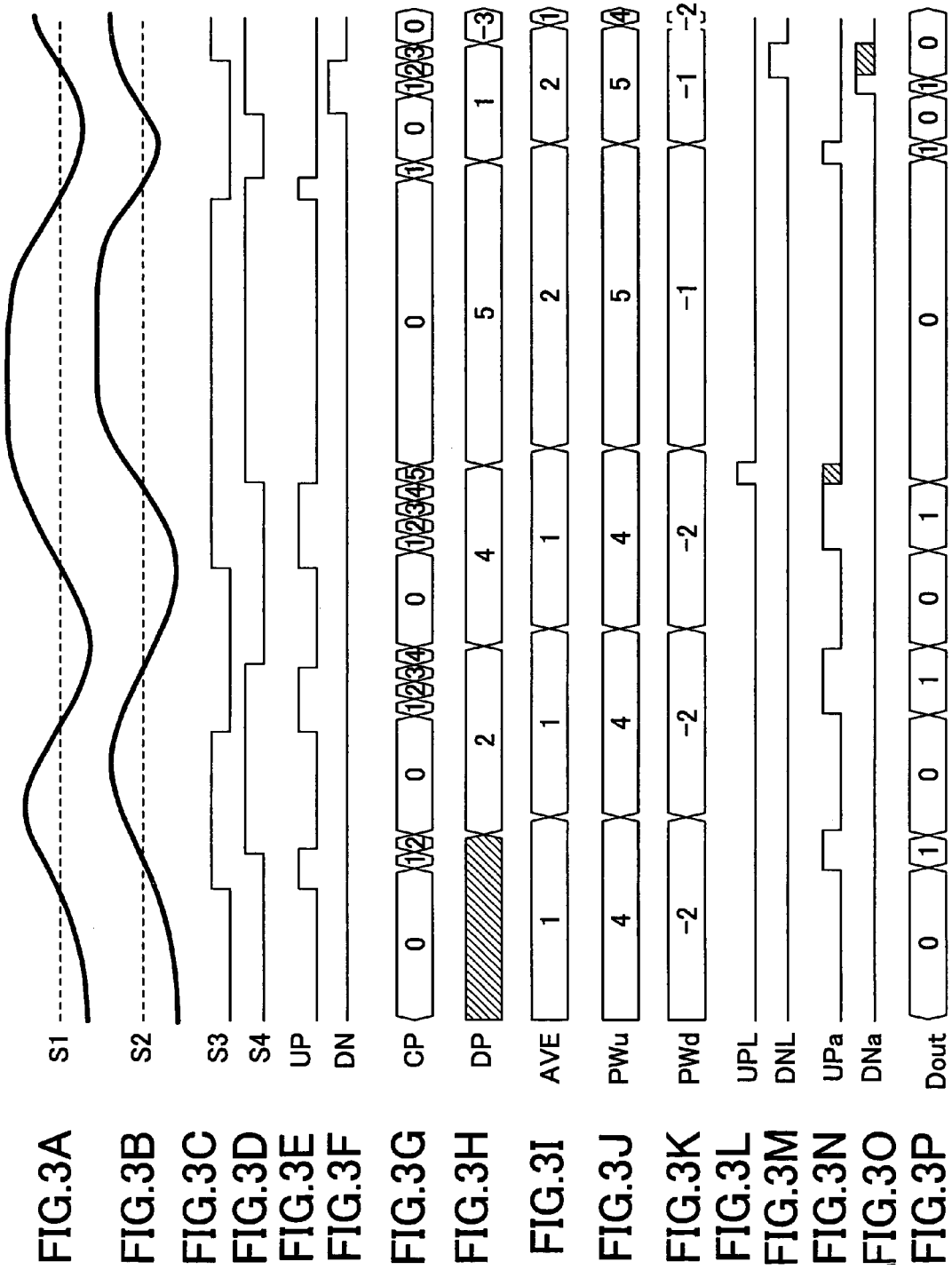
FIG. 3A through FIG. 3P show a timing chart illustrating operations of the phase difference detection circuit 21.

FIG. 3A through FIG. 3P show timing charts for explaining operations of the phase difference detection circuit 21.

The comparator 24 converts the signal S1 output from the adding circuit 22 into a digital signal depending on whether the signal is higher than a certain threshold value. The sampling circuit 26 samples the digital signal output from the comparator 24 and obtains the signal S3, and outputs the signal S3 to the phase comparison circuit 28.

Similarly, the comparator 25 converts the signal S2 output from the adding circuit 23 into a digital signal depending on whether the signal is higher than a certain threshold value. The sampling circuit 27 samples the digital signal output from the comparator 25 and obtains the signal S4, and outputs the signal S4 to the phase comparison circuit 28.

The phase comparison circuit 28 compares the phase of the signal S3 and the phase of the signal S4, and detects the phase difference between the signal S3 and the signal S4 in units of preset clock pulses. When the phase of the digital signal S3 is earlier than the phase of the digital signal S4, the phase comparison circuit 28 outputs a phase difference signal UP at a high level having a width equaling the phase difference, which indicates that the phase of the digital signal S3 is advanced. Whereas, when the phase of the digital signal S4 is earlier than the phase of the digital signal S3, the phase comparison circuit 28 outputs a phase difference signal DN at a high level having a width equaling the phase difference, which indicates that the phase of the digital signal S3 is delayed.

FIG. 3C through FIG. 3F reveal that the phase comparison circuit 28 sets the phase difference signal UP or the phase difference signal DN to the high level in accordance with the phase difference at the edge of each pit on the optical disk 2, that is, at the rising edge or falling edge of the level of the signal S3 or the signal S4. Then, the phase comparison circuit 28 outputs thus generated the phase difference signal UP or the phase difference signal DN to the phase difference calculation circuit 29.

Next, the phase difference calculation circuit 29 digitizes the duration of the high level of the phase difference signal UP or the phase difference signal DN output from the phase comparison circuit 28 with the period of a clock signal to be units in a time axis. For example, pulses of the clock signal are counted during the high level of the phase difference signal UP or the phase difference signal DN, and the obtained count, which is denoted to be "phase difference data DP", corresponds to the phase difference. For example, when the phase difference is zero, the phase difference data DP is zero; when the phase difference signal UP is at the high level, the phase difference data DP is positive; when the phase difference signal DN is at the high level, the phase difference data DP is negative. Specifically, with reference to FIG. 3E through FIG. 3H, when the duration of the high level of the phase difference signal UP equals two clock pulses, the phase difference data DP equals 2; when the phase difference is zero, the phase difference data DP is zero; and when the duration of the high level of the phase difference signal DN equals three clock pulses, the phase difference data DP equals −3.

The phase difference calculation circuit 29 stores nonezero phase difference data DP in the phase difference memory 30 as one of the previous phase differences. When the phase difference memory 30 is full, the phase difference calculation circuit 29 cancels the oldest phase difference data so as to maintain the phase difference data DP in the phase difference memory 30 to be the latest ones.

The phase difference window generation circuit 31 calculates an average value of the latest previous phase difference data DP stored in the phase difference memory 30, and this average value is regarded as the average phase difference AVE, for example, the average value of the latest previous phase difference data DP can be calculated by simple averaging without weights, or by using a low-pass filter to remove high frequency components.

With the obtained average phase difference AVE as a reference, the phase difference window generation circuit 31 generates a phase difference window PW. The coverage of the phase difference window PW can be set by using a register (not illustrated). For example, as shown in FIG. 3I through FIG. 3K, when the signal S1 is advanced, the upper limit PWu of the phase difference window PW is determined to be the above average phase difference AVE plus +3, whereas, when the signal S2 is advanced, the lower limit PWd of the phase difference window PW is determined to be the average phase difference AVE plus −3.

The phase difference window generation circuit 31 outputs the generated phase difference window PW to the phase difference calculation circuit 29.

When the phase difference data DP is greater than the upper limit PWu of the phase difference window PW, the phase difference calculation circuit 29 corrects the phase difference data DP to be the upper limit PWu; when the phase difference data DP is less than the lower limit PWd of the phase difference window PW, the phase difference calculation circuit 29 corrects the phase difference data DP to be the lower limit PWd.

The phase difference calculation circuit 29 outputs the value (for example, "1") of the duration of the high level of the phase difference signal UP corresponding to the corrected phase difference phase data PD, the value (for example, "−1") of the duration of the high level of the phase difference signal DN corresponding to the corrected phase difference phase data PD, and the value "0" when both the phase difference signal UP and the phase difference signal DN corresponding to the corrected phase difference phase data PD are at low levels to the low-pass filter 32.

The low-pass filter 32 generates digital data indicating an average value of the data signal Dout output from the phase difference calculation circuit 29, with the average value varying at a certain time constant. The low-pass filter 32 outputs the digital data as the tracking error signal TE.

Note that it can be set that the phase difference calculation circuit 29 can select whether the uncorrected phase difference data DP or the corrected phase difference data DP as the phase difference data DP are to be stored in the phase difference memory 30.

The operations of the phase difference calculation circuit 29 are described in detail with reference to FIG. 3A through FIG. 3P and FIG. 4.

Figure 4:
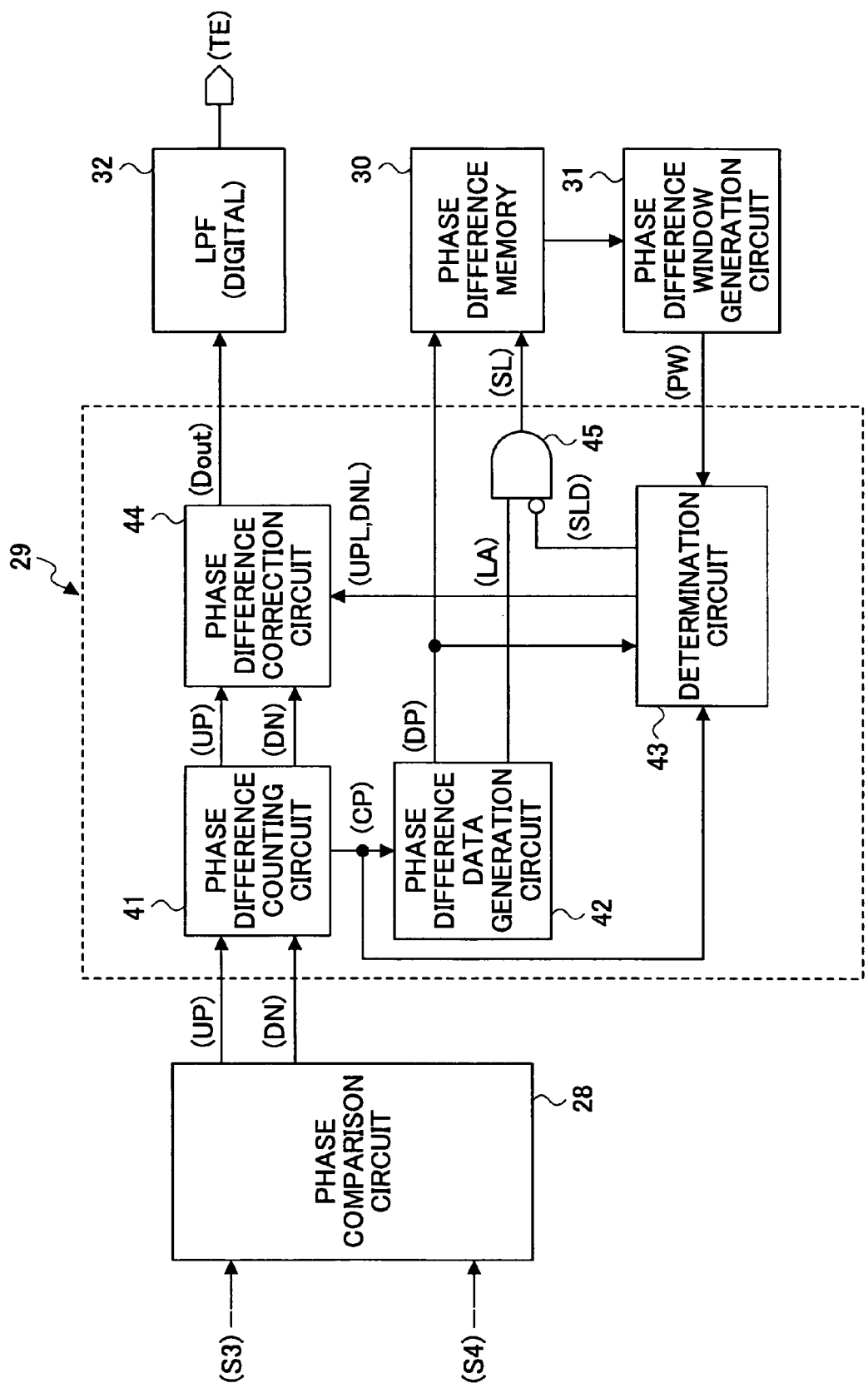
FIG. 4 is a block diagram showing an example of a configuration of the phase difference calculation circuit 29 according to the first embodiment of the present invention.

FIG. 4 is a block diagram showing an example of a configuration of the phase difference calculation circuit 29 according to the first embodiment of the present invention.

As illustrated in FIG. 4, the phase difference calculation circuit 29 includes a phase difference counting circuit 41, a phase difference data generation circuit 42, a determination circuit 43, a phase difference correction circuit 44, and an AND circuit 45.

The phase difference counting circuit 41 counts pulses of a clock signal during the high level of the phase difference signal UP or the phase difference signal DN with the period of the clock signal to be units in the time axis, generates a phase difference count data signal CP indicating the obtained counts, and outputs the phase difference count data signal CP to the phase difference data generation circuit 42 and the determination circuit 43.

The phase difference data generation circuit 42 generates the phase difference data DP by using the phase difference count data signal CP from the phase difference counting circuit 41, and outputs the phase difference data DP to the phase difference memory 30 and the determination circuit 43, and sets a latch signal LA, which directs writing the phase difference data DP into the phase difference memory 30, to a high level, and outputs the latch signal LA to a non-inverted input terminal of the AND circuit 45.

The determination circuit 43 determines whether the input phase difference data DP is within the phase difference window PW input from the phase difference window generation circuit 31. When the input phase difference data DP is not within the phase difference window PW, the determination circuit 43 generates an UP limit signal UPL or a DN limit signal DNL depending on the value of the phase difference data DP, and outputs the UP limit signal UPL or the DN limit signal DNL to the phase difference correction circuit 44.

When the phase difference data DP is within the phase difference window PW, as shown in FIG. 3L, the determination circuit 43 sets the UP limit signal UPL and the DN limit signal DNL to the low level. When the phase difference data DP is greater than the upper limit PWu of the phase difference window PW, as shown in FIG. 3L, the determination circuit 43 sets the UP limit signal UPL to the high level in synchronization with a period in which the value of the phase difference count data signal CP is "5".

When the phase difference data DP is less than the lower limit PWd of the phase difference window PW, as shown in FIG. 3M, the determination circuit 43 sets the DN limit signal DNL to the high level in synchronization with a period in which the value of the phase difference count data signal CP is "−2" and "−3".

When the phase difference data DP is out of the phase difference window PW, the determination circuit 43 sets a latch-disable signal SLD remaining at a high level, whereas when the phase difference data DP is within the phase difference window PW, the determination circuit 43 sets the latch-disable signal SLD to a low level, and outputs the latch signal LA to a non-inverted input terminal of the AND circuit 45.

When the latch-disable signal SLD is set to remain at the high level, regardless of the input latch signal LA, the AND circuit 45 outputs a latch signal SL at the low level; in this case, the phase difference memory 30 does not store the input phase difference data DP.

When the latch-disable signal SLD is set to the low level, the input latch signal LA is output as the latch signal SL to the phase difference memory 30; and in this case, the phase difference memory 30 stores the input phase difference data DP when the input latch signal SL is at the high level, and does not store the input phase difference data DP when the input latch signal SL is at the low level.

The phase difference correction circuit 44 corrects the phase difference signal UP to the low level and outputs a corrected phase difference signal UPa in the period when the UP limit signal UPL is at the high level, and corrects the phase difference signal DN to the low level and outputs a corrected phase difference signal DNa in the period when the DN limit signal DNL is at the high level.

In addition, the phase difference correction circuit 44 generates the data signal Dout and outputs the data signal Dout to the low-pass filter 32. As illustrated in FIG. 3P, the data signal Dout equals "1" when the corrected phase difference signal UPa is at the high level, equals "−1" when the corrected phase difference signal DNa is at the high level, and equals "0" when both the corrected phase difference signal UPa and the corrected phase difference signal DNa are at the low level.

Figure 5:
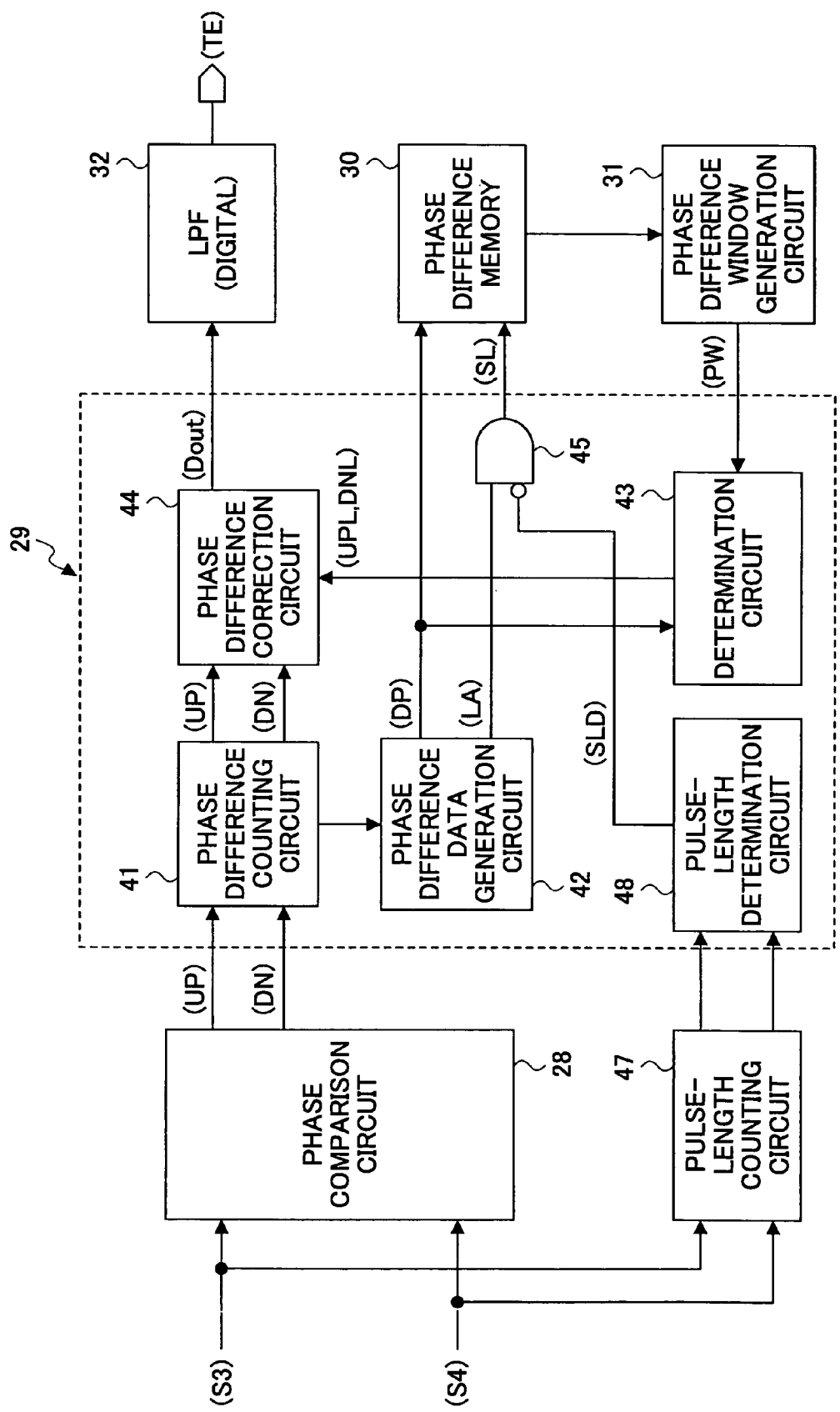
FIG. 5 is a block diagram showing another example of the configuration of the phase difference calculation circuit 29 according to the first embodiment of the present invention.

FIG. 5 is a block diagram showing another example of the configuration of the phase difference calculation circuit 29 according to the first embodiment of the present invention.

In FIG. 5, the same reference numbers are assigned to the same elements as those shown in FIG. 4, and overlapping descriptions are omitted.

The configuration in FIG. 5 differs from that in FIG. 4 in that a pulse-length counting circuit 47 is added in the phase difference detection circuit 21 shown in FIG. 2, and a pulse-length determination circuit 48 is added in the phase difference calculation circuit 29 shown in FIG. 4.

The pulse-length counting circuit 47 counts pulses of a clock signal with the period of the clock signal to be units in the time axis to determine pulse lengths of the signal S3 and the signal S4.

The pulse-length determination circuit 48 determines whether the pulse lengths given by the pulse-length counting circuit 47 are less than a predetermined value, and generates and outputs the latch-disable signal SLD in response to the determination results. The pulse-length counting circuit 47 corresponds to the pulse length detection circuit in claims.

As illustrated in FIG. 5, the pulse-length counting circuit 47 counts the pulse length of the signal S3 output from the sampling circuit 26, and outputs the counts to the pulse-length determination circuit 48.

Similarly, the pulse-length counting circuit 47 counts the pulse length of the signal S4 output from the sampling circuit 27, and outputs the counts to the pulse-length determination circuit 48.

When it is determined that at least one of the pulse lengths output from the pulse-length counting circuit 47 is less than a predetermined value $\alpha$, the pulse-length determination circuit 48 outputs the latch-disable signal SLD at the high level to an inverted input terminal of the AND circuit 45. When it is determined that both of the pulse lengths output from the pulse-length counting circuit 47 are greater than the predetermined value $\alpha$, the pulse-length determination circuit 48 outputs the latch-disable signal SLD at the low level to the inverted input terminal of the AND circuit 45.

Namely, when at least one of the pulse lengths of the signal S3 and the signal S4 is less than the predetermined value $\alpha$, the phase difference data DP related to such signals S3 and S4 is not stored in the phase difference memory 30, and only when both of the pulse lengths of the signal S3 and the signal S4 are greater than the predetermined value $\alpha$, the corresponding phase difference data DP is stored in the phase difference memory 30.

It is known that short lands or pits correspond to pulses of small amplitude, and usually the error of the phase difference at a cross point between the pulses and a reference voltage is large; particularly, in worst cases, a pulse of small amplitude does not cross the reference voltage, and this pulse is lost. To avoid this problem, in the present embodiment, it is required that the phase difference data associated with short pulse lengths, and thus having large errors, are not stored, that is, the phase difference having large errors are not used in finding the average phase difference.

According to the phase difference detection circuit according to the first embodiment, the circuits in the DPD circuit for generating the tracking error signal TE, namely, the circuits for generating the tracking error signal TE from the output signals from the comparators 24, 35, are constituted by digital circuits, the digital tracking error signal TE is generated from the digital signals output from the comparators 24, 35. As a result, it is possible to reduce the circuit area.

In addition, the latest previous phase difference data are stored in the phase difference memory 30, a phase difference window PW is defined from the average phase difference calculated from the phase differences stored in the phase difference memory 30, and it is required that the phase difference data to be stored in the phase difference memory 30 are within the phase difference window PW. Because the phase signal does not change drastically in an on-track state, when an input phase difference is out of the phase difference window PW, it can be judged that the input phase difference is related to phase anomaly or edge shift caused by small signal amplitude. By making correction to this phase difference, it is possible to reduce the error of the phase difference.

Second Embodiment

In the first embodiment, the width of the phase difference window PW is constant regardless of the value of the tracking error signal TE. In the present embodiment, the width of the phase difference window PW generated by the phase difference window generation circuit 31 can be changed depending on whether the value of the tracking error signal TE is within a predetermined range.

Figure 6:
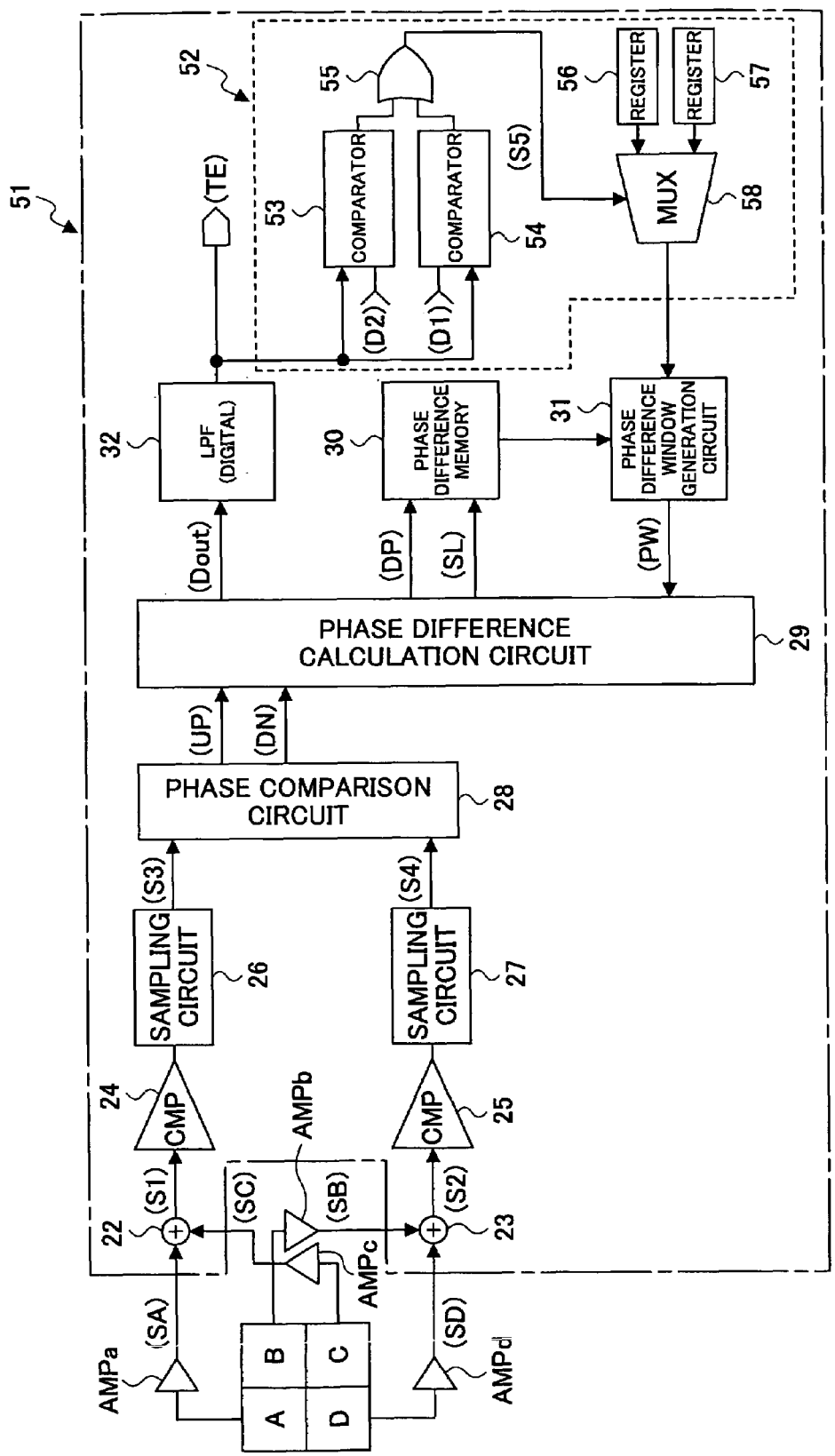
FIG. 6 is a block diagram showing a schematic configuration of a phase difference detection circuit 51 according to a second embodiment of the present invention.

FIG. 6 is a block diagram showing a schematic configuration of a phase difference detection circuit 51 according to the second embodiment of the present invention.

In FIG. 6, the same reference numbers are assigned to the same elements as those shown in FIG. 2, and overlapping descriptions are omitted. Further, in the second embodiment, the optical disk device using the phase difference detection circuit 51 has the same configuration as that shown in FIG. 1.

The phase difference detection circuit 51 in FIG. 6 differs from the phase difference detection circuit 21 in FIG. 2 in that a phase difference window width setting circuit 52 is provided for the phase difference window generation circuit 31 in addition to the components in the phase difference detection circuit 21, to set the width of the phase difference window PW according to the value of the tracking error signal TE.

In FIG. 6, the phase difference window width setting circuit 52 determines whether the present state is an on-track state depending on whether the data value (Dte) of the generated tracking error signal TE is within a predetermined range, specifically, whether Dte satisfies: D1<Dte<D2, where, D1 and D2 are preset values. Based on the determination results, the phase difference window width setting circuit 52 sets a quantity, which is to be added to or subtracted from the average value AVE of the phase differences, in the phase difference window generation circuit 31.

The phase difference window width setting circuit 52 is constructed by a digital circuit including comparators 53, 54 for comparing input data, an OR circuit 55, registers 56, 57, and a multiplexer 58. Note that the comparators 53, 54 and the OR circuit 55 correspond to the determination circuit in claims, and the registers 56, 57 and the multiplexer 58 correspond to the window range modification circuit in claims.

The comparator 53 compares data Dte with the preset value D2, and outputs a low-level signal when Dte is greater than or equal to D2, and outputs a high-level signal when Dte is less than D2.

The comparator 54 compares data Dte with the preset value D1, and outputs a high-level signal when Dte is greater than D1, and outputs a low-level signal when Dte is less than or equal to D1.

When Dte satisfies: D1<Dte<D2, the OR circuit 55 outputs a low-level window width modification signal S5, and when Dte does not satisfy D1<Dte<D2, the OR circuit 55 outputs a high-level window width modification signal S5.

When the window width modification signal S5 is at a low level, the multiplexer 58 outputs a window width W1 stored in the register 56 to the phase difference window generation circuit 31, and when the window width modification signal S5 is at a high level, the multiplexer 58 outputs a window width W2 stored in the register 57 to the phase difference window generation circuit 31. The window width W2 is greater than the window width W1.

In other words, when Dte satisfies: D1<Dte<D2, namely, in the on-track state, the width of the phase difference window PW is reduced. Because the phase signal does not change drastically on different pits in the on-track state, by reducing the width of the phase difference window PW, correction to the phase difference becomes strong.

When Dte does not satisfy D1<Dte<D2, namely, Dte≦D1, or Dte≧D2, the width of the phase difference window PW is increased, and thus, variation of the phase difference signal is large. Especially, for example, when a beam spot is riding on two pits, two tracking error signals corresponding to the two tracks interfere with each other, and phase anomaly occurs. In response to such situations, the width of the phase difference window PW is increased when the value of the tracking error signal becomes large to allow just weak corrections to the phase difference, or essentially prevent corrections to the phase difference.

The phase difference window generation circuit 31 calculates a new upper limit PWu and a new lower limit PWd of the phase difference window PW, with the average phase difference AVE as a center, so that the width of the phase difference window PW becomes the window width input from the multiplexer 58.

For example, when the relation D1<Dte<D2 is satisfied, the phase difference window width setting circuit 52 determines that the present state is an on-track state, and outputs a value WD1, which is to be added to or subtracted from the average value AVE of the phase differences, to the phase difference window generation circuit 31.

The phase difference window generation circuit 31 finds a new upper limit PWu of the phase difference window PW to be AVE+WD1, and a new lower limit PWd of the phase difference window PW to be AVE−WD1.

When the relation D1<Dte<D2 is not satisfied, the phase difference window width setting circuit 52 determines that the present state is not an on-track state, and outputs a value WD2, which is greater than WD1, to the phase difference window generation circuit 31.

The phase difference window generation circuit 31 finds a new upper limit PWu of the phase difference window PW to be AVE+WD2, and a new lower limit PWd of the phase difference window PW to be AVE−WD2.

It should be noted that although it is described above to use two threshold values D1 and D2, three or more threshold values can be used, and the window width modification signal S5 can have two or more bits; in doing so, it is possible to change setting of the width of the phase difference window PW in small steps to closely follow variation of the value Dte of the tracking error signal TE.

According to the present embodiment, the width of the phase difference window PW is variable depending on the value Dte of the tracking error signal TE. For example, in a complete on-track state, the width of the phase difference window PW can be reduced to allow strong correction to the phase difference, whereas in a state deviating more or less from the complete on-track state, the width of the phase difference window can be increased to allow only weak correction to the phase difference. Furthermore, when a beam spot moves away from a track, the width of the phase difference window can be further increased to essentially prevent correction to the phase difference. In this way, by making correction to the phase difference in correspondence to actual situations, it is possible to further reduce errors of the phase differences.

Third Embodiment

In the second embodiment, the width of the phase difference window PW can be changed according to the value of the tracking error signal TE. In the present embodiment, comparison is made between the phase difference data DP output from the phase difference calculation circuit 29 to the phase difference memory 30, and the average phase difference AVE generated by the phase difference window generation circuit 31; the width of the phase difference window PW generated by the phase difference window generation circuit 31 can be changed depending on the comparison results.

Figure 7:
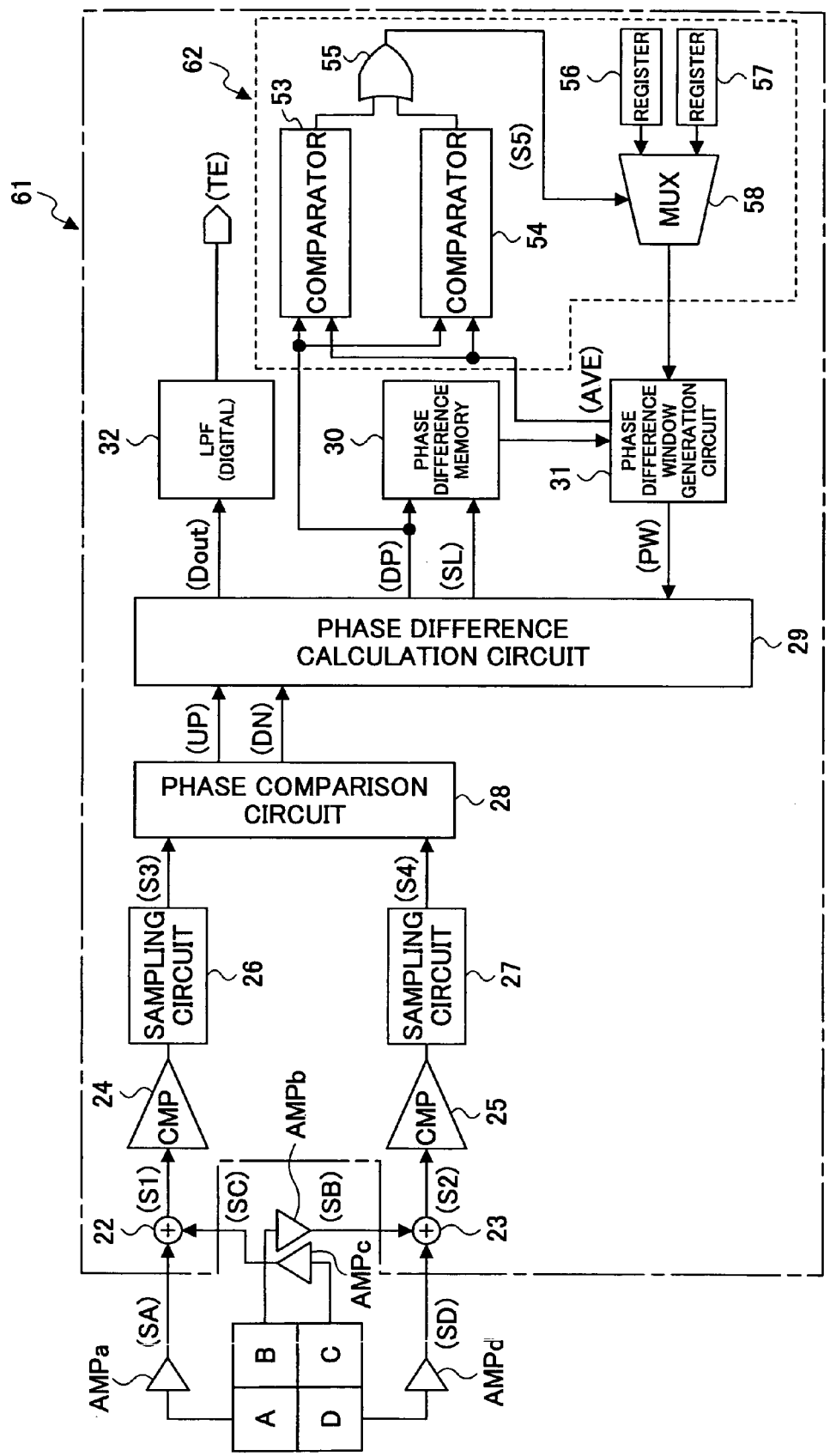
FIG. 7 is a block diagram showing a schematic configuration of a phase difference detection circuit 61 according to a third embodiment of the present invention.

FIG. 7 is a block diagram showing a schematic configuration of a phase difference detection circuit 61 according to the third embodiment of the present invention.

In FIG. 7, the same reference numbers are assigned to the same elements as those shown in FIG. 6, and overlapping descriptions are omitted. Further, in the third embodiment, the optical disk device using the phase difference detection circuit 61 has the same configuration as that shown in FIG. 1.

The phase difference detection circuit 61 in FIG. 7 differs from the phase difference detection circuit 51 in FIG. 6 in that the phase difference window width setting circuit 52 in FIG. 6 is replaced by a phase difference window width setting circuit 62, which compares the phase difference data DP output from the phase difference calculation circuit 29 to the phase difference memory 30, and the average phase difference AVE generated by the phase difference window generation circuit 31, and changes the width of the phase difference window PW generated by the phase difference window generation circuit 31 in accordance with the comparison results.

Specifically, the phase difference window width setting circuit 62 compares the phase difference data DP output from the phase difference calculation circuit 29 to the phase difference memory 30, and the average phase difference AVE generated by the phase difference window generation circuit 31, and determines whether the present state is an on-track state depending on whether the phase difference data DP satisfies (AVE−β)<DP<(AVE+β), where, β is a given value. Based on the determination results, the phase difference window width setting circuit 62 sets a quantity, which is to be added to or subtracted from the average value AVE of the phase differences, in the phase difference window generation circuit 31.

The phase difference window width setting circuit 62 is structured by a digital circuit including comparators 53, 54 for comparing input data, an OR circuit 55, registers 56, 57, and a multiplexer 58.

The comparator 53 compares the phase difference data DP with (AVE−β), and outputs a low-level signal when the phase difference data DP is greater than (AVE−β), whereas outputs a high-level signal when the phase difference data DP is less than (AVE−β).

The comparator 54 compares the phase difference data DP with (AVE+β), and outputs a high-level signal when the phase difference data DP is greater than (AVE+β), whereas outputs a low-level signal when the phase difference data DP is less than (AVE+β).

When the phase difference data DP satisfies (AVE−β)<DP<(AVE+β), the OR circuit 55 outputs a low-level window width modification signal S5, and when the phase difference data DP does not satisfy (AVE−β)<DP<(AVE+β), the OR circuit 55 outputs a high-level window width modification signal S5.

When the window width modification signal S5 is at a low level, the multiplexer 58 outputs a window width W1 stored in the register 56 to the phase difference window generation circuit 31, and when the window width modification signal S5 is at a high level, the multiplexer 58 outputs a window width W2 stored in the register 57 to the phase difference window generation circuit 31. Here, the window width W2 is greater than the window width W1.

In other words, when the phase difference data DP satisfies (AVE−β)<DP<(AVE+β), namely, in the on-track state, the width of the phase difference window PW is reduced. Because the phase signal does not change drastically on different pits in the on-track state, by reducing the width of the phase difference window PW, correction to the phase difference becomes strong.

When the phase difference data DP does not satisfy (AVE−β)<DP<(AVE+β), namely, DP≦(AVE−β), or DP≧(AVE+β), the width of the phase difference window PW is increased, and thus, variation of the phase difference signal is large. Especially, for example, when a beam spot is riding on two pits, two tracking error signals corresponding to the two tracks interfere with each other, and phase anomaly occurs. In this situation, when the phase difference data DP becomes large, it is necessary to increase the width of the phase difference window PW to allow just weak corrections to the phase difference, or essentially prevent corrections to the phase difference.

The phase difference window generation circuit 31 calculates a new upper limit PWu and a new lower limit PWd of the phase difference window PW, with the average phase difference AVE as a center, so that the width of the phase difference window PW becomes the window width input from the multiplexer 58.

For example, when the relation (AVE−β)<DP<(AVE+β) is satisfied, the phase difference window width setting circuit 62 determines that the present state is an on-track state, and outputs a quantity WD1, which is to be added to or subtracted from the average value AVE of the phase differences, to the phase difference window generation circuit 31.

The phase difference window generation circuit 31 finds a new upper limit PWu of the phase difference window PW to be AVE+WD1, and a new lower limit PWd of the phase difference window PW to be AVE−WD1.

When the relation (AVE−β)<DP<(AVE+β) is not satisfied, the phase difference window width setting circuit 62 determines that the present state is not an on-track state, and outputs a value WD2, which is greater than WD1, to the phase difference window generation circuit 31.

The phase difference window generation circuit 31 finds a new upper limit PWu of the phase difference window PW to be AVE+WD2, and a new lower limit PWd of the phase difference window PW to be AVE−WD2.

It should be noted that although it is described above to use two threshold values (AVE−β) and (AVE+β), three or more threshold values can be used, and the window width modification signal S5 can have two or more bits. In doing so, it is possible to change setting of the width of the phase difference window PW in small steps to closely follow variation of the phase difference data DP.

According to the present embodiment, the width of the phase difference window PW is variable depending on the phase difference data DP. For example, in a complete on-track state, the width of the phase difference window PW can be reduced to allow strong correction to the phase difference, whereas in a state deviating more or less from the complete on-track state, the width of the phase difference window can be increased to allow only weak correction to the phase difference. Furthermore, when a beam spot moves away from a track, the width of the phase difference window can be further increased to essentially prevent correction to the phase difference. In this way, by making correction to the phase difference in correspondence to actual situations, it is possible to further reduce errors of the phase differences.

In addition, compared to the case in which the tracking error signal TE is used to change the width of the phase difference window, because the tracking error signal TE is obtained through the low-pass filter 32 which has slow response, in the present embodiment, it is possible to improve following capability of the phase difference window to variation of tracking states.

Fourth Embodiment

In the first to third embodiments, before detection of the phase difference, the signal SA is summed with the signal SC, and the signal SB is summed with the signal SD. In the present embodiment, each of the signals SA, SB, SC, and SD is converted into a digital signal by a comparator, the digital signal is sampled in a sampling circuit, then the phase difference between the signal SA and the signal SB, and the phase difference between the signal SC and the signal SD are detected, separately, and then signals indicating the two phase differences are summed.

Figure 8:
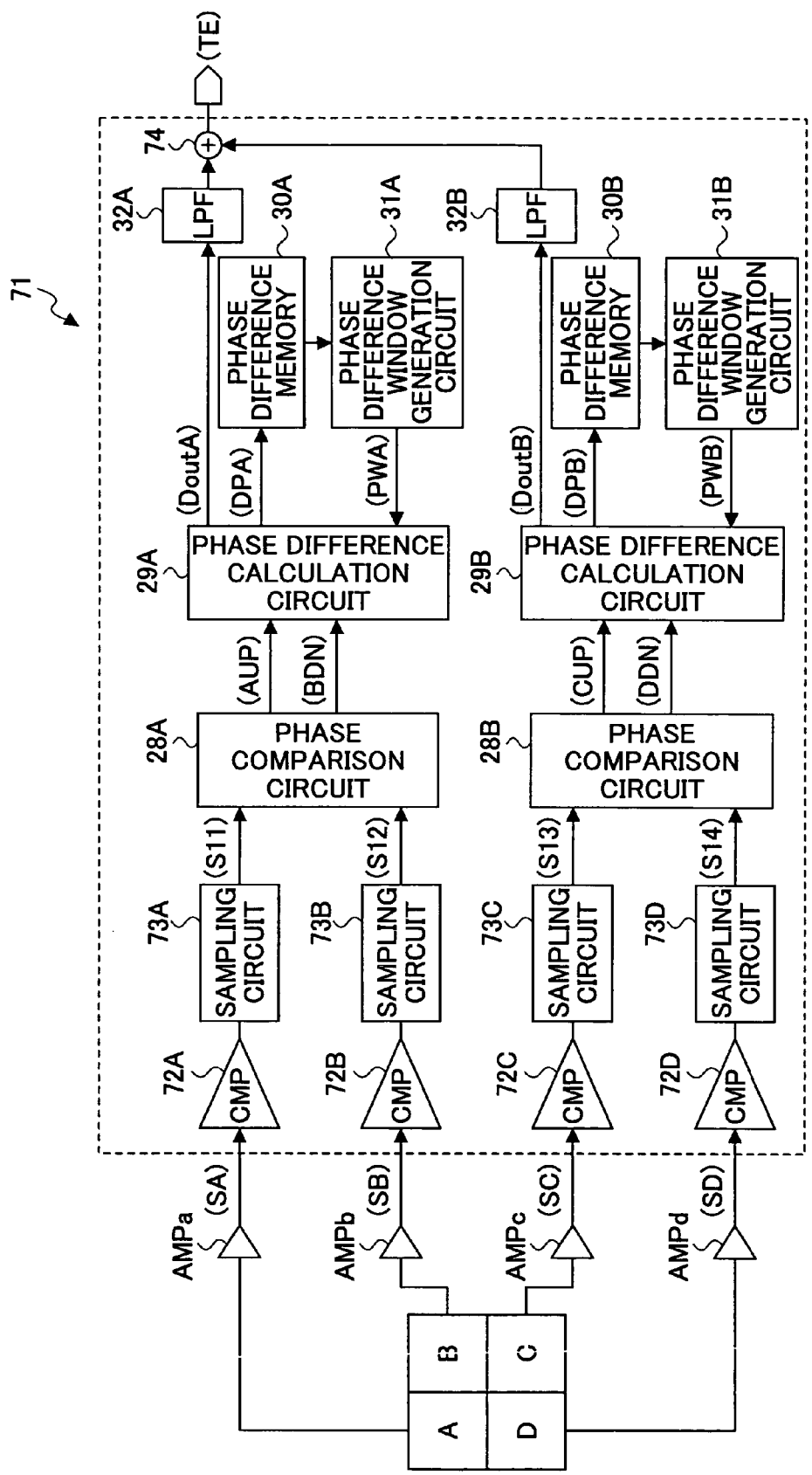
FIG. 8 is a block diagram showing a schematic configuration of a phase difference detection circuit 71 according to a fourth embodiment of the present invention.
Figure 9:
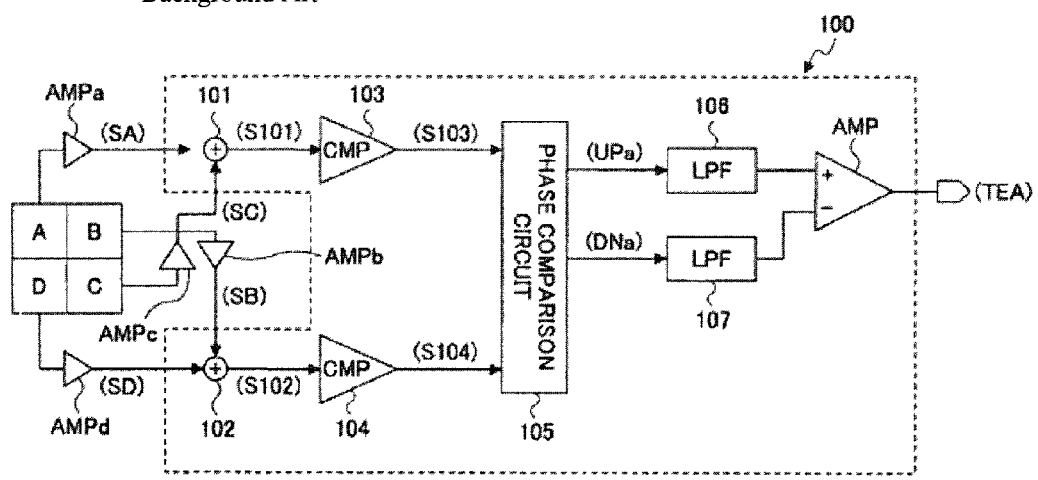
FIG. 9 is a block diagram illustrating a configuration of a DPD circuit used as a phase difference detection circuit in an optical disk device of the related art.

FIG. 8 is a block diagram showing a schematic configuration of a phase difference detection circuit 71 according to the fourth embodiment of the present invention.

In FIG. 8, the same reference numbers are assigned to the same elements as those shown in FIG. 2, and overlapping descriptions are omitted. Further, in the fourth embodiment, the optical disk device using the phase difference detection circuit 71 has the same configuration as that shown in FIG. 1.

As illustrated in FIG. 8, reproduction signals from the four light receiving elements A, B, C and D are amplified by the amplifiers AMPa through AMPd, respectively. The signals SA through SD amplified by the amplifiers AMPa through AMPd are input to the phase difference detection circuit 71.

In the phase difference detection circuit 71, the signals SA through SD are converted into digital signals by comparators 72A through 72D, respectively, and are further sampled by sampling circuits 73A through 73D, respectively.

Signals S11, S12 from the sampling circuits 73A, 73B are input to a phase comparison circuit 28A, and signals S13, S14 from the sampling circuits 73C, 73D are input to a phase comparison circuit 28B.

The phase comparison circuits 28A and 28B are the same as the phase comparison circuit 28 in FIG. 2. The phase comparison circuit 28A compares the phase of the signal S11 and the phase of the signal S12, whereas the phase comparison circuit 28B compares the phase of the signal S13 and the phase of the signal S14.

When the phase of the signal S11 is earlier than the phase of the signal S12, the phase comparison circuit 28A outputs a high-level phase difference signal AUP having a width equaling the phase difference between the signal S11 and the signal S12, which indicates that the phase of the signal S11 is advanced. Whereas, when the phase of the signal S12 is earlier than the phase of the signal S11, the phase comparison circuit 28A outputs a high-level phase difference signal BDN having a width equaling the phase difference between the signal S11 and the signal S12, which indicates that the phase of the digital signal S11 is delayed.

Similarly, when the phase of the signal S13 is earlier than the phase of the signal S14, the phase comparison circuit 28B outputs a high-level phase difference signal CUP having a width equaling the phase difference between the signals S13 and S14, which indicates that the phase of the signal S13 is advanced. Whereas, when the phase of the signal S14 is earlier than the phase of the signal S13, the phase comparison circuit 28B outputs a high-level phase difference signal DDN having a width equaling the phase difference between the signals S13 and S14, which indicates that the phase of the digital signal S13 is delayed.

The phase difference calculation circuits 29A and 29B are the same as the phase difference calculation circuit 29 in FIG. 2, the phase difference memories 30A and 30B are the same as the phase difference memory 30, the phase difference window generation circuits 31A and 31B are the same as the phase difference window generation circuit 31 in FIG. 2, and the low-pass filters 32A and 32B are the same as the low-pass filter 32 in FIG. 2.

Signals output from the low-pass filters 32A and 32B are summed in an adding circuit 74, and the resulting signal is output as the tracking error signal TE.

The phase comparison circuits 28A, 28B, the phase difference calculation circuits 29A, 29B, the phase difference memories 30A, 30B, the phase difference window generation circuits 31A, 31B, and the low-pass filters 32A, 32B are digital circuits. The adding circuit 74 may be a sum-amplifier using an OP-amplifier and resistors.

The sampling circuits 73A through 73D, the phase comparison circuits 28A, 28B, the phase difference calculation circuits 29A, 29B, the phase difference memories 30A, 30B, the phase difference window generation circuits 31A, 31B, the low-pass filters 32A, 32B, and the adding circuit 74 correspond to the phase difference correction circuit in claims. In addition, the comparators 72A through 72D correspond to the conversion circuit in claims, the sampling circuits 73A through 73D and the phase comparison circuits 28A, 28B correspond to the phase comparison circuit in claims, the phase difference calculation circuits 29A, 29B correspond to the phase difference generation circuit in claims, the phase difference memories 30A, 30B correspond to the phase difference storage circuit in claims, and the phase difference window generation circuits 31A, 31B correspond to the phase difference window generation circuit in claims.

According to the present embodiment, the signals SA through SD obtained by amplifying the reproduction signals from the four light receiving elements A, B, C and D are converted into digital signals, but not summed before phase difference detection; the phase difference between the signal S11 and the signal S12 is detected by the phase comparison circuit 28A, the phase difference between the signal S13 and the signal S14 is detected by the phase comparison circuit 28B, and from the phase difference signals AUP and BDN, and CUP and DDN, separate phase difference corrections based on separate phase difference windows are performed, and this process generates corrected phase difference signals AUPa, BDNa, CUPa, and DDNa. These corrected phase difference signals AUPa, BDNa, CUPa, and DDNa are converted into data signals and are smoothed, and then are summed in the adding circuit 74, resulting in the tracking error signal TE. In doing so, the same effect as that in the first embodiment can be obtained; further, it is possible to generate the tracking error signal TE precisely.

While the present invention is described above with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2004-171343 filed on Jun. 9, 2004, and the entire contents of which are hereby incorporated by reference.

What is claimed is:

1. A phase difference detection circuit that detects a phase difference between at least two signals and outputs a phase difference signal indicating the detected phase difference, said at least two signals being obtained by summing predetermined signals among a plurality of signals input to the phase difference detection circuit, said phase difference detection circuit comprising:

a phase difference correction circuit that detects and stores the phase difference between the at least two signals at a predetermined timing;

wherein when the detected phase difference is greater than an upper limit of a phase difference window, the phase difference correction circuit corrects the detected phase difference to be the upper limit and outputs the corrected phase difference, and when the detected phase difference is less than a lower limit of the phase difference window, the phase difference correction circuit corrects the detected phase difference to be the lower limit and outputs the corrected phase difference, said phase difference window being defined in a range from said lower limit to said upper limit, said upper limit and said lower limit being defined to be an average value of a plurality of said stored phase differences plus and minus a predetermined value, respectively.

2. A phase difference detection circuit that detects a plurality of phase differences between predetermined signals among a plurality of signals input to the phase difference detection circuit, outputs a plurality of phase difference signals each indicating one of the detected phase differences, sums predetermined signals of the phase difference signals, and outputs the summed signal, said phase difference detection circuit comprising:

a phase difference correction circuit that detects and stores the phase differences at predetermined timings;

wherein when the detected phase difference is greater than an upper limit of a phase difference window, the phase difference correction circuit corrects the detected phase difference to be the upper limit and outputs the corrected phase difference, and when the detected phase difference is less than a lower limit of the phase difference window, the phase difference correction circuit corrects the detected phase difference to be the lower limit and outputs the corrected phase difference, said phase difference window being defined in a range from said lower limit to said upper limit, said upper limit and said lower limit being defined to be an average value of a plurality of said stored phase differences plus and minus a predetermined value, respectively.

3. The phase difference detection circuit as claimed in claim 1, wherein the phase difference correction circuit comprises a digital circuit; and the phase difference signal is a digital signal.

4. The phase difference detection circuit as claimed in claim 1, wherein the phase difference correction circuit prohibits storage of the detected phase difference when the detected phase difference is out of the phase difference window.

5. The phase difference detection circuit as claimed in claim 4, further including a conversion circuit that converts the at least two signals into digital signals, respectively, wherein the phase difference correction circuit comprises:

a phase comparison circuit that compares phases of the digital signals output from the conversion circuit, and outputs a signal indicating a comparison result;

a phase difference generation circuit that detects a phase difference between the at least two signals from the signals output from the phase comparison circuit, and generates and outputs a signal indicating the detected phase difference;

a phase difference storage circuit that stores the phase difference detected in the phase difference generation circuit; and a phase difference window generation circuit that calculates the average value of the phase differences stored by the phase difference storage circuit, and generates the phase difference window by adding the predetermined value to the average value and subtracting the predetermined value from the average value; wherein the phase difference generation circuit receives the phase difference window from the phase difference window generation circuit, corrects the detected phase difference by using the phase difference window, and prohibits storage of the detected phase difference in the phase difference storage circuit when the detected phase difference is out of the phase difference window.

6. The phase difference detection circuit as claimed in claim 5, wherein the phase difference correction circuit further comprises:

a determination circuit that determines whether the output phase difference is within the predetermined range; and a window range modification circuit that modifies the range of the phase difference window in the phase difference window generation circuit in response to a determination result from the determination circuit; wherein the window range modification circuit sets the range of the phase difference window to be a predetermined value W1 when the determination circuit determines that the output phase difference is within the predetermined range, and sets the range of the phase difference window to be a predetermined value W2 greater than W1 when the determination circuit determines that the output phase difference is out of the predetermined range.

7. The phase difference detection circuit as claimed in claim 5, wherein the phase difference correction circuit further comprises:

a determination circuit that determines whether the phase difference before the correction is within the predetermined range; and a window range modification circuit that modifies the range of the phase difference window in the phase difference window generation circuit in response to a determination result from the determination circuit; wherein the window range modification circuit sets the range of the phase difference window to be a predetermined value W1 when the determination circuit determines that the phase difference before the correction is within the predetermined range, and sets the range of the phase difference window to be a predetermined value W2 greater than W1 when the determination circuit determines that the phase difference before the correction is out of the predetermined range.

8. The phase difference detection circuit as claimed in claim 1, wherein the phase difference correction circuit converts the at least two signals into digital signals, respectively; and the phase difference correction circuit prohibits storage of the detected phase difference between the at least two signals when a pulse length of at least one of the digital signals is less than a predetermined value.

9. The phase difference detection circuit as claimed in claim 8, further including a conversion circuit that converts the at least two signals into digital signals, respectively, wherein the phase difference correction circuit comprises:

a pulse length detection circuit that detects pulse lengths of the at least two digital signals output from the conversion circuit;

a phase comparison circuit that compares phases of the digital signals output from the conversion circuit, and outputs a signal indicating a comparison result;

a phase difference generation circuit that detects a phase difference between the at least two signals from the signals output from the phase comparison circuit, and generates and outputs a signal indicating the detected phase difference;

a phase difference storage circuit that stores the phase difference detected by the phase difference generation circuit; and a phase difference window generation circuit that calculates the average value of the phase differences stored in the phase difference storage circuit, and generates the phase difference window by adding the predetermined value to the average value and subtracting the predetermined value from the average value; wherein the phase difference generation circuit receives the phase difference window from the phase difference window generation circuit, corrects the detected phase difference by using the phase difference window, and prohibits storage of the detected phase difference in the phase difference storage circuit when the pulse length of at least one of the digital signals detected by the pulse length detection circuit is less than a predetermined value.

10. The phase difference detection circuit as claimed in claim 1, wherein the phase difference correction circuit sets the range of the phase difference window to be a predetermined value W1 when the output phase difference is within a predetermined range, and sets the range of the phase difference window to be a predetermined value W2 greater than W1 when the output phase difference is out of the predetermined range.

11. The phase difference detection circuit as claimed in claim 1, wherein
the phase difference correction circuit sets the range of the phase difference window to be a predetermined value W1 when the phase difference before the correction is within a predetermined range, and sets the range of the phase difference window to be a predetermined value W2 greater than W1 when the phase difference before the correction is out of the predetermined range, said predetermined range being defined based on the average value.

12. An optical disk device for recording and reproducing data in an optical disk, comprising:
a phase difference detection circuit that detects a phase difference between at least two signals and outputs a phase difference signal indicating the detected phase difference, said at least two signals being obtained by summing predetermined signals among a plurality of signals output from a plurality of light receiving elements that receive reflected light of a laser beam incident on a recording plane of the optical disk;
wherein
the phase difference detection circuit includes a phase difference correction circuit that detects and stores the phase difference between the at least two signals at a predetermined timing,
when the detected phase difference is greater than an upper limit of a phase difference window, the phase difference correction circuit corrects the detected phase difference to be the upper limit and outputs the corrected phase difference, and when the detected phase difference is less than a lower limit of the phase difference window, the phase difference correction circuit corrects the detected phase difference to be the lower limit and outputs the corrected phase difference, said phase difference window being defined in a range from said lower limit to said higher limit, said upper limit and said lower limit being defined to be an average value of a plurality of said stored phase differences plus and minus a predetermined value, respectively.

13. An optical disk device for recording and reproducing data in an optical disk, comprising:
a phase difference detection circuit that detects a plurality of phase differences between predetermined signals among a plurality of signals output from a plurality of light receiving elements that receive reflected light of a laser beam incident on a recording plane of the optical disk, outputs a plurality of phase difference signals each indicating one of the detected phase differences, sums predetermined signals of the phase difference signals, and outputs the summed signal;
wherein
the phase difference detection circuit includes a phase difference correction circuit that detects and stores the phase differences at predetermined timings,
when the detected phase difference is greater than an upper limit of a phase difference window, the phase difference correction circuit corrects the detected phase difference to be the upper limit and outputs the corrected phase difference, and when the detected phase difference is less than a lower limit of the phase difference window, the phase difference correction circuit corrects the detected phase difference to be the lower limit and outputs the corrected phase difference, said phase difference window being defined in a range from said lower limit to said upper limit, said upper limit and said lower limit being defined to be an average value of a plurality of said stored phase differences plus and minus a predetermined value, respectively.

14. The optical disk device as claimed in claim 12, wherein
the phase difference correction circuit comprises a digital circuit; and
the phase difference signal is a digital signal.

15. The optical disk device as claimed in claim 12, wherein the phase difference correction circuit prohibits storage of the detected phase difference when the detected phase difference is out of the phase difference window.

16. The optical disk device as claimed in claim 12, wherein
the phase difference correction circuit converts the at least two signals into digital signals, respectively; and
the phase difference correction circuit prohibits storage of the detected phase difference between the at least two signals when a pulse length of at least one of the digital signals is less than a predetermined value.

17. The optical disk device as claimed in claim 12, wherein
the phase difference correction circuit sets the range of the phase difference window to be a predetermined value W1 when the output phase difference is within a predetermined range, and sets the range of the phase difference window to be a predetermined value W2 greater than W1 when the output phase difference is out of the predetermined range.

18. The optical disk device as claimed in claim 12, wherein
the phase difference correction circuit sets the range of the phase difference window to be a predetermined value W1 when the phase difference before the correction is within a predetermined range, and sets the range of the phase difference window to be a predetermined value W2 greater than W1 when the phase difference before the correction is out of the predetermined range, said predetermined range being defined based on the average value.

* * * * *